United States Patent
Aperce et al.

(10) Patent No.: US 6,767,495 B2
(45) Date of Patent: Jul. 27, 2004

(54) MOLD AND PROCESS FOR MOLDING A TREAD

(75) Inventors: Jean-Claude Aperce, Pont-Du-Chateau (FR); Gilbert Menard, Volic (FR); Jose Merino Lopez, Riom (FR)

(73) Assignee: Michelin Recherche et Technique S. A., Grange-Paccot (CH)

( * ) Notice: Subject to any disclaimer, the term of this patent is extended or adjusted under 35 U.S.C. 154(b) by 333 days.

(21) Appl. No.: 10/077,222

(22) Filed: Feb. 15, 2002

(65) Prior Publication Data

US 2002/0142056 A1 Oct. 3, 2002

(30) Foreign Application Priority Data

Feb. 20, 2001 (FR) .............................................. 01 02437

(51) Int. Cl.⁷ .............................................. B29C 33/02
(52) U.S. Cl. ......................... 264/326; 264/325; 425/46
(58) Field of Search ................................ 264/320, 325, 264/326, 328.1, 328.2, 328.3, 501; 425/38, 46, 47, 54, 55

(56) References Cited

U.S. PATENT DOCUMENTS

| | | |
|---|---|---|
| 1,599,772 A | 9/1926 | Krusemark |
| 1,733,064 A | 10/1929 | Lambert |
| 4,289,463 A | * 9/1981 | Le Moullac .................. 425/47 |
| 4,828,471 A | * 5/1989 | Schlautmann ................. 425/29 |
| 5,141,424 A | * 8/1992 | Christof ..................... 425/28.1 |
| 5,261,804 A | * 11/1993 | Jachowsky .................... 425/47 |

FOREIGN PATENT DOCUMENTS

| | | |
|---|---|---|
| FR | WO 98 54009 A | 12/1998 |
| FR | 1 103 362 A1 | 5/2001 |
| GB | 474588 | 6/1937 |

* cited by examiner

Primary Examiner—James Sells
(74) Attorney, Agent, or Firm—Martin Farrell; Alan A. Csontos; Martin Remick

(57) ABSTRACT

The invention relates to a mold and a process for molding a tread 11 and a tire having a tread, the tread including a running surface 12, lateral surfaces 13, axial recesses 15 opening axially on to at least one of the lateral surfaces, the process including steps of inserting into the uncured tread projections 5 which mold the axial recesses 15, and of then removing them from the vulcanized tread, the process being characterized in that the projections 5 are inserted in the direction of the thickness of the tread 11 and are removed in the direction of the width of the tread 11.

11 Claims, 2 Drawing Sheets

MOLD AND PROCESS FOR MOLDING A TREAD

BACKGROUND AND SUMMARY OF THE INVENTION

The present invention relates to molds and to the processes of molding treads. In particular, it relates to molds and the processes for molding tires whose tread comprises indentations, channels or other recesses extending substantially transversely to the tread and which open onto the lateral faces of the tread. These recesses do not open, or do not fully open out at the surface of the tread when this is new. This is known as an evolutionary sculpture tread, because as the tread wears and the "subterranean" or "subsurface" channels appear, the visible and therefore active profile of the tread evolves. An advantage of such treads is for example to give substantially constant performance throughout the normal service life of the tire. The patent application WO98/54009 describes such notions.

These particular forms of tread can be realized with various molding processes linked to various molding techniques. When such processes are implemented industrially, two major problems have to be overcome: on the one hand, to make the molding successful, i.e. to create without defect (visible or otherwise) a tire comprising axial channels in the tread; and, on the other hand, to permit ejection, i.e. separation, of the molded tire from the elements constituting the mold without the risk of damage either to the tire or to the tooling.

The document WO98/54009 describes such a process and a mold for this process. The axial channels of the tread are molded by fingers integral with the shells provided for molding the sides of the tire. During molding, the internal pressure on the uncured (hence moldable) tire exerted by the membrane causes the outer diameter of the uncured tire to expand. This stage, known as "shaping," allows the material forming the uncured tread to fill all the spaces in the mold to create the final tread comprising the various grooves and recesses which can be seen to open at the running surface or at the shoulders. In order to remove the tire from the mold, the shells are removed axially, which allows the fingers to be extracted from the tread. The segments of the crown ring, which mold the running surface, are removed radially in order to allow their projecting parts (the projections which mold the sculpturing) to disengage from the tread of the molded tire.

One problem with this process is that it is, of course, limited to manufactures in which shaping is relatively extensive, because the shaping must correspond at least to the thickness of the intended sculpture, including the subjacent channels. Indeed, since the fingers are carried by the shells for molding the sides, their radial position is fixed. In order to be loaded into the mold, the uncured tire must therefore have an outer diameter which allows it to be positioned (radially) within the fingers. Then, the diametric expansion (or shaping) brought about, for example, by the inflation of a vulcanization membrane must be sufficient to make the molding material penetrate around the fingers and into all the spaces in the tread.

However, industry strives to limit to the maximum the size of shaping, and this is for at least two reasons. The first reason is the objective of greater uniformity of the molded tires. In fact, the greater the degree of shaping, the more difficult it is to obtain regular distribution of the molding material that flows when the uncured tire is subjected to pressure. The second reason is the use of more and more rigid (inextensible) forms of tire architecture in order to improve certain tire performances (e.g. at high speed). These forms of architecture are consequently less and less capable of extension, hence of shaping.

Another known process (described for example in U.S. Pat. No. 1,733,064) consists in inserting fingers or pins axially into the uncured rubber of the tread. This method then encounters other limitations: the geometry and resistance of the fingers or pins must permit their penetration without risking damage to the tool but also without moving or deforming the uncured tire in an unwanted manner. In practice, this technique is therefore restricted to fingers having a simple geometry and sufficient thickness to resist buckling. On the other hand, the kinematics necessary to control the movements of these fingers also imposes a considerable restriction on the possible forms.

An object of the invention is therefore a mold and process which permit both low-shaping or no shaping manufacturing and which would not suffer from the above-mentioned limitations.

This object is achieved by a mold for a tire tread having a running surface, lateral surfaces, radial recesses opening at the running surface and axial recesses opening on to at least one of the lateral surfaces, the mold comprising a first plurality of crown sectors for molding the radial recesses, a second plurality of shoulder sectors, among which at least some carry projections for molding the axial recesses, the crown sectors being radially movable between an open configuration permitting loading of uncured tire into the mold and a closed configuration permitting molding of the tire, the mold being characterized in that the shoulder sectors are radially movable between the open configuration and the closed configuration independently of the crown sectors.

Indeed, the mold according to the invention, by the radial mobility of the elements molding the channels or transverse subterranean recesses, permits simultaneously loading of the uncured tire without constraint due to the presence of these elements, low or zero shaping molding, and problem-free ejection from the mold.

Preferably, the projections carried by the shoulder sectors take the form of fingers and extend substantially axially projecting from said sectors and preferably over a distance of more than 10%, or preferably even more than 25% of the width of the crown sectors.

In a preferred embodiment, the fingers bear, during the closing movement, on the crown sectors in order to resist the pressure exerted by the molding material on the fingers during closing of the mold/and or during shaping.

In a particular embodiment, the fingers extend in a generally oblique direction relative to the axis of the tire. In this case, the second plurality of shoulder sectors is preferably capable of moving in rotation about the axis of the tire in order to ease ejection from the mold.

The invention also relates to a process of molding a tread comprising a running surface, lateral surfaces, axial recesses opening axially (in the width direction) on to at least one of the lateral surfaces, the process comprising the steps of inserting into the uncured tread projections which mold the axial recesses, and then extracting the projections from the vulcanized tread, the projections being inserted in the direction of the thickness of the tread and extracted in the direction of the width of the tread. The act of inserting the projections into the uncured rubber, at least in part by a movement in the thickness direction of the tread, which is independent of any shaping, makes it possible to reduce or even render superfluous the process of shaping. The act of then extracting the projections in the direction of the width of the molded tread (i.e. in the direction of the axis of the tire for which the tread is intended) makes it possible to eject the tire without damage, even when the length of the projections is considerable.

Preferably, the process according to the invention uses a mold such as described above and comprises successively the following steps:

Inserting an uncured tire into the mold in an open configuration,

Closing the mold by centripetal motion of the crown sectors and shoulder sectors, Molding the tire, Opening the mold by radial motion of the crown sectors in order to eject the radial recesses, the shoulder sectors remaining substantially in a closed configuration, and, Continuing opening of the mold by axial motion of the shoulder sectors.

Preferably, in accordance with this process, the diameter of the uncured tire is less than the diameter of the molded tire by a value "d," which is less than 1% of the diameter of the molded tire.

The invention will be explained more fully with the aid of a description of the drawings.

DETAILED DESCRIPTION

Figure 1:
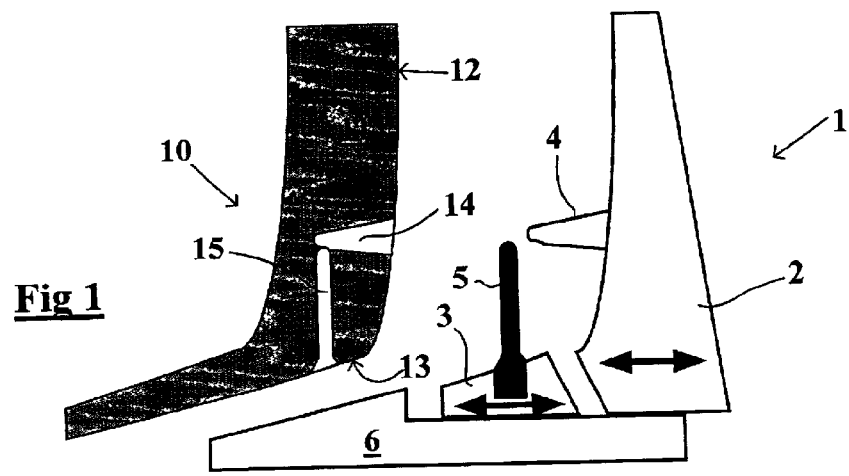
FIG. 1 shows diagrammatically in radial section part of a mold in an open configuration, as well as the corresponding part of a molded tire according to the invention.

In FIG. 1, the mold according to the invention is shown, in section view, in its open configuration. In order to illustrate the various functions of the elements described, a corresponding part of a tire 10 obtained from this mold 1 is also shown. In this partial view in section, one can see a crown sector 2 bearing a relief element 4 for molding a recess or groove 14 of the tread 11 of the tire 10. The crown sector 2 is radially movable (the radial direction is indicated by the arrows) relative to a shell 6 that molds the sides of the tire 10 in known manner. The surface for molding the shoulder 13 of the tire is defined at least in part by a plurality of elements similar to the shoulder sector 3 visible here. The shoulder sector 3 has a projection 5 capable of defining channels or recesses 15 under the running surface 12 of the tire. The shoulder sector 3 is also movable radially relative to the shell 6 and to the crown sector 2 in order to allow the process according to the invention to take place.

Figure 2:
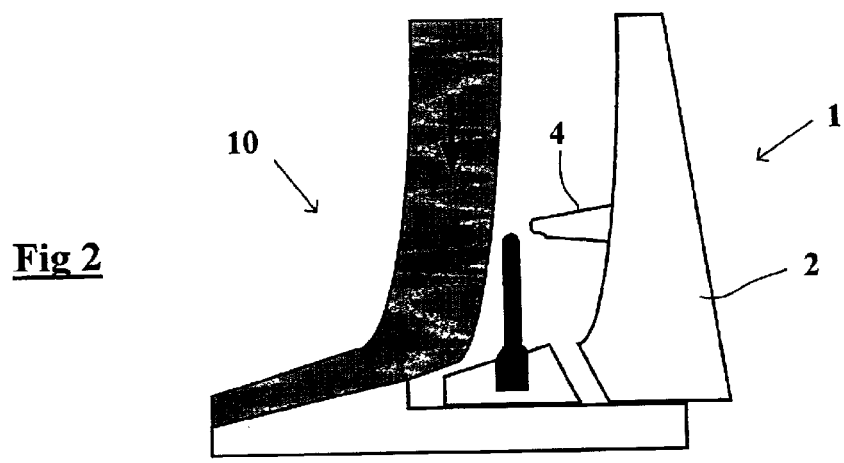
FIG. 2 shows diagrammatically in radial section part of a mold with an open configuration during the first stage of the process, i.e. loading an uncured tire.

FIG. 2 shows the first step of the process according to the invention, wherein an uncured tire 10 is inserted into the mold in open configuration as described in FIG. 1. It should be noted here that the radial mobility of the shoulder sector 3 makes possible an uncured tire diameter which is larger than that of the prior art described above.

Figure 3:
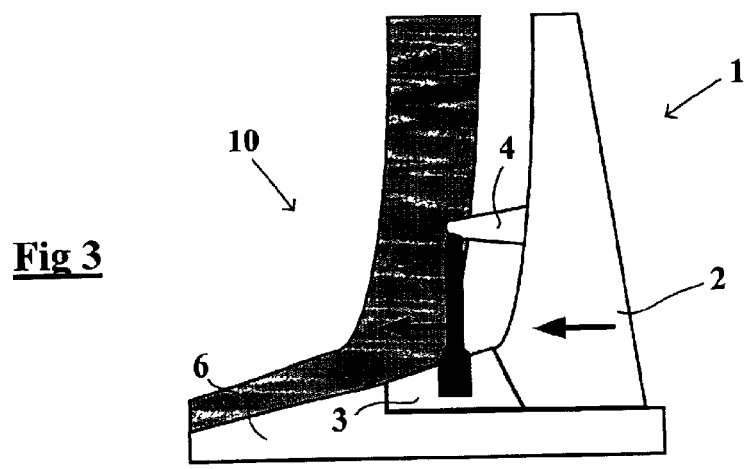
FIG. 3 shows diagrammatically in radial section part of a mold with a closed configuration during the second stage of molding according to the invention.

The second step of the process is shown in FIG. 3. The mold adopts its closed configuration in which the crown sectors 2 and shoulder sectors 3 engage the uncured rubber and the relief elements 4 and projections 5 penetrate the uncured rubber of the tread 11 radially (the arrows show the movement of the elements relative to the preceding stage).

Figure 4:
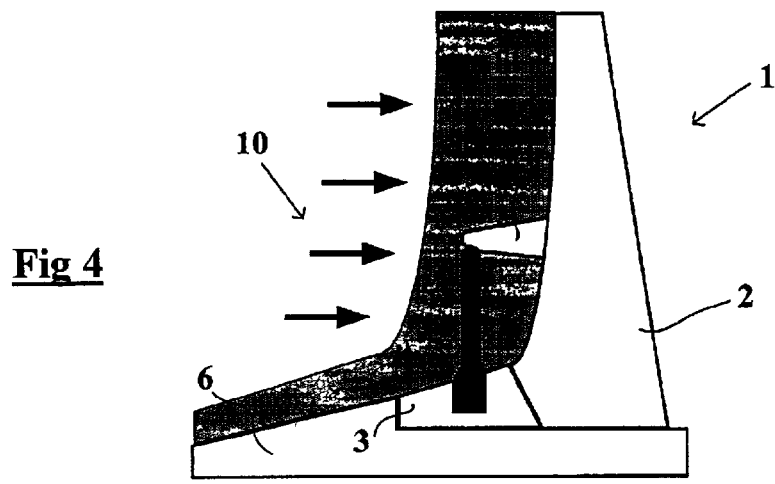
FIG. 4 shows diagrammatically in radial section part of a mold with a closed configuration during the third (optional) stage of the process according to the invention.

The third step of the process, shown at FIG. 4, is that of shaping. Although this stage is shown as following the previous step of FIG. 3, it can obviously start during the second step (in order for example to shorten the cycle and/or to exert a counter-pressure during the movement of the mobile sectors). During shaping, the uncured tire is inflated, generally via a membrane, in order that the tire conforms to the molding surfaces. During this step, as in the preceding step, the projections 5 can bear on the crown sectors 2 via relief portions 4. This is particularly advantageous if the projections 5 are relatively long and thin, i.e. liable to bend under the pressure of the uncured rubber. The projections shown here extend as far as the first groove 14, but they may of course extend beyond this first groove, for example in order to occupy the entire half-width of the tread, by bearing possibly on a plurality of reliefs such as the relief 4 shown. The molding material is at the same time heated and starts its vulcanization. Molding processes without shaping are known, as for example molding processes on a rigid core. This type of process is entirely compatible with that of the invention, for example by realizing the molding assembly at the second step described in FIG. 3. That is why shaping is not an indispensable stage of the process according to the invention but a stage which may complement the forming begun in the second stage. The mold and process according to the invention make it possible in fact to limit the shaping necessary, or to omit it entirely.

Figure 5:
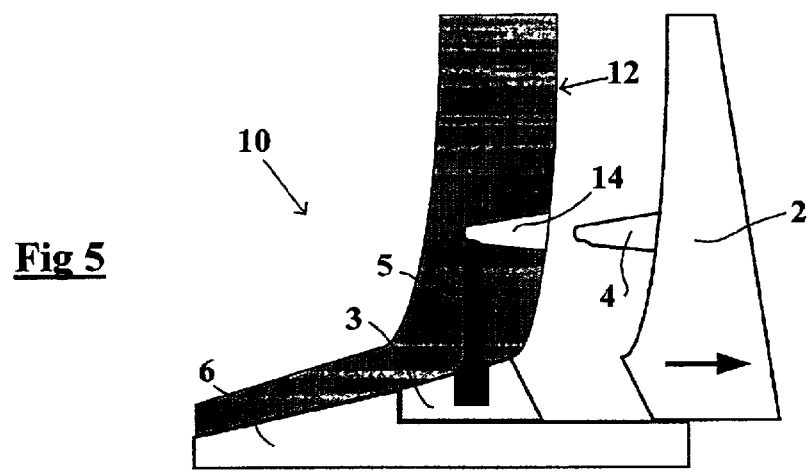
FIG. 5 shows diagrammatically in radial section part of a mold with a partly open configuration during the fourth stage of the process according to the invention.

FIG. 5 shows the fourth step, which corresponds to ejection of the tread 12 from the mold, that is, demolding, in order to disengage sufficiently the relief elements 4 from the grooves 14. By virtue of the independence of the radial movements of the crown sectors 2 relative to the shoulder sectors 3, this operation does not cause any particular mechanical stress to the tread or tire.

Figure 6:
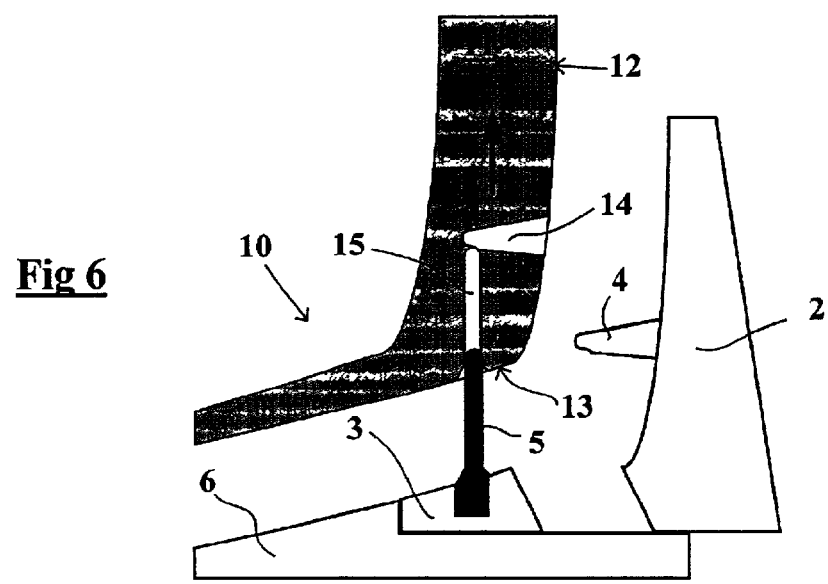
FIG. 6 shows diagrammatically in radial section part of a mold with a partly open configuration during the fifth stage of the process according to the invention.

FIG. 6 shows the last step of the process, which consists in demolding the vulcanized tire axially. The substantially axial projections 5 are shown having the form of rectilinear fingers, although this is only an example. The elasticity of the rubber during ejection in fact allows for different finger shapes, for example curved or having undercut shapes. In addition, these fingers may be at a large angle relative to the tire axis, in which case it is preferable to allow the shoulder sectors 3 to revolve about this axis in order to facilitate ejection in the manner of a corkscrew. Optionally, the fingers may furthermore have a degree of freedom in terms of their individual fixing to the shoulder sectors in order to facilitate ejection. This degree of freedom may, for example, be obtained by a resilient attachment or controlled play.

The figures show roughly half of a tread 11, so that the projections shown in this example have a length of about 15 to 20% of the width of the tread. In fact, the longer the projections, the more advantageous the principle of the invention. Channels extending beyond the center of the tread may also be molded. Obviously, shorter channels are also conceivable, for example, in order to form a lateral marking in the tread which is deeper and therefore more visible than those realized in a known manner in the sides of tires.

The number of fingers or projections 5 and shoulder sectors 3 is determined according to the result sought in the finished tread. Each sector may carry a plurality of fingers or conversely certain sectors may not have a finger. In fact their functions are independent: that of the sectors is to permit radial expansion; whereas, the function of the fingers is to realize molding of the axial channels 15. For example, eight shoulder sectors 3 may be formed per side, each bearing three fingers 5.

It will be apparent to those skilled in the art, that the invention can be applied irrespectively of whether it is desired to mold channels only one side or on both. The shell opposite the shell 6 shown in the drawings may carry or not carry, in a symmetrical fashion or otherwise, shoulder sectors such as described. On the other hand, the crown sectors 2 may cover the entire width of the tread in the manner described in the specification WO98/54009 or only part thereof.

In general, a particular advantage of the invention is to have different kinematics for molding from those for ejection from the mold. That is to say, the projections or fingers are inserted into the uncured rubber in the direction of the thickness of the tread, the radial direction of the tire, and are withdrawn, after molding, following the axis of the tire. Thus, by adapting the tooling described above, it is possible to mold treads which are non-annular, of finite length, or conversely of virtually infinite length in a continuous manner and flat. It is thus possible to mold not only treads intended for the production or re-treading of tires, but also for molding rubber caterpillar tracks.

The term "tire" here refers to all types of resilient, pneumatic or non-pneumatic wheel coverings that are subject during use to an internal pressure or otherwise.

What is claimed is:

1. A mold for a tire having a tread comprising a running surface, lateral surfaces, radial recesses opening onto the running surface and axial recesses opening on to at least one of the lateral surfaces, the mold comprising:
   a first plurality of crown sectors for molding the radial recesses,
   a second plurality of shoulder sectors, the shoulder sectors having mounted thereon projections for molding the axial recesses, the crown sectors being radially movable between an open configuration for loading the uncured tire into the mold and a closed configuration for molding the tire,
   wherein, the shoulder sectors are movable radially between the open configuration and the closed configuration independently of the crown sectors.

2. The mold according to claim 1, wherein the projections mounted on the shoulder sectors have the form of fingers and extend substantially axially from the shoulder sectors.

3. The mold according to claim 2, wherein the fingers extend axially a distance greater than 10% of the width of the crown sectors.

4. The mold according to claim 2, wherein the fingers extend axially a distance greater than 25% of the width of the crown sectors.

5. The mold according to claim 4, wherein the shoulder sectors are disposed relative to the crown sectors so that the fingers bear on the crown sectors during movement of the mold from the open to the closed configuration.

6. The mold according to claim 1, the projections mounted on the shoulder sectors have the form of fingers and extend in a direction generally oblique to the axis of the tire.

7. The mold according to claim 6, wherein the shoulder sectors are disposed in the mold for rotation about the tire axis.

8. A process for molding a tread having a width direction and a thickness direction, a running surface, lateral surfaces, and axial recesses opening in the width direction on to at least one of the lateral surfaces, the process comprising the steps of:
   inserting into an uncured tread a plurality of projections for molding axial recesses, the plurality of projections being inserted in the thickness direction,
   vulcanizing the tread, and
   removing said plurality of projections from the vulcanized tread, the plurality of projections being moved in the width direction.

9. The process for molding according to claim 8, wherein a diameter of the uncured tire is smaller than a diameter of the molded tire by a value "d" which is less than 1% of the diameter of the molded tire.

10. A process for molding a tire with a tread in a mold having a plurality of crown sectors radially movable between a mold open and a mold closed position for molding the radial recesses, and further having a plurality of shoulder sectors and projections for molding axial recesses mounted on the shoulder sectors, the shoulder sectors being movable radially between the mold open position and the mold closed position independently of the crown sectors, the method comprising the steps of:
   inserting an uncured tire into the mold in the open position,
   closing the mold by centripetal movement of the crown sectors and shoulder sectors, the crown sectors and projections penetrating the tread with radially directed movement,
   molding the tire,
   opening the mold first by radial movement of the crown sectors to remove the crown sectors from the radial recesses, the shoulder sectors remaining substantially in closed configuration,
   continuing to open the mold by axial movement of the shoulder sectors 3 to remove the projections from axially recesses.

11. The process for molding according to claim 10, wherein a diameter of the uncured tire is smaller than the diameter of the molded tire by a value "d" which is less than 1% of the diameter of the molded tire.

* * * * *